United States Patent [19]
Gombert et al.

[11] Patent Number: 4,572,840
[45] Date of Patent: Feb. 25, 1986

[54] METHOD OF MANUFACTURING AN OPTICAL FIBER WITH CHIRALIC STRUCTURE AND A DEVICE FOR PUTTING THIS METHOD INTO PRACTICE

[75] Inventors: Jean Gombert, Paris; Serge Blaison, Orsay; Christian Quinty, La Ville du Bois; Maryse Gazard, Puteaux, all of France

[73] Assignee: Thomson-CSF, Paris, France

[21] Appl. No.: 696,492

[22] Filed: Jan. 30, 1985

[30] Foreign Application Priority Data

Feb. 2, 1984 [FR] France .................. 84 01600

[51] Int. Cl.⁴ .............. C03C 25/02; B05C 11/00; B05D 5/06; B05D 3/06
[52] U.S. Cl. .................................. 427/36; 65/3.11; 118/44; 427/44; 427/54.1; 427/163
[58] Field of Search ............ 427/36, 44, 54, 163; 118/44; 65/3.11

[56] References Cited

U.S. PATENT DOCUMENTS 4,427,717 1/1984 Gauthier .................. 427/163
4,509,968 4/1985 Arditty et al. ............ 65/10.1

FOREIGN PATENT DOCUMENTS 3010005 12/1981 Fed. Rep. of Germany .

OTHER PUBLICATIONS

*Chemical Abstracts*, vol. 94, No. 12, Mar. 23, 1981, Ref. No. 89072m, p. 326, Nippon Telegraph and Telephone.
*Chemical Abstracts*, vol. 95, No. 18, Nov. 2, 1981, Ref. No. 155316t, p. 296, Fujikura Cable Works.
*Chemical Abstracts*, vol. 95, No. 8, Aug. 1981, Ref. No. 66609y, p. 287, Nippon Telegraph and Telephone.

*Primary Examiner*—James R. Hoffman
*Attorney, Agent, or Firm*—Oblon, Fisher, Spivak, McClelland & Maier

[57] ABSTRACT

The method consists in twisting a fiber already coated with a primary coating about its axis of symmetry at a temperature less than the vitreous transition temperature of this fiber; in coating it with a polymer in the viscous state so as to form an envelope about this fiber; in curing said polymer while increasing its YOUNG's modulus.

17 Claims, 6 Drawing Figures

FIG.1 PRIOR ART
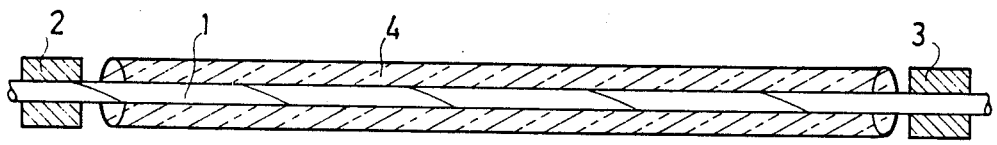
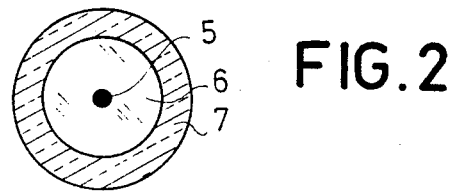
FIG.2
FIG.3
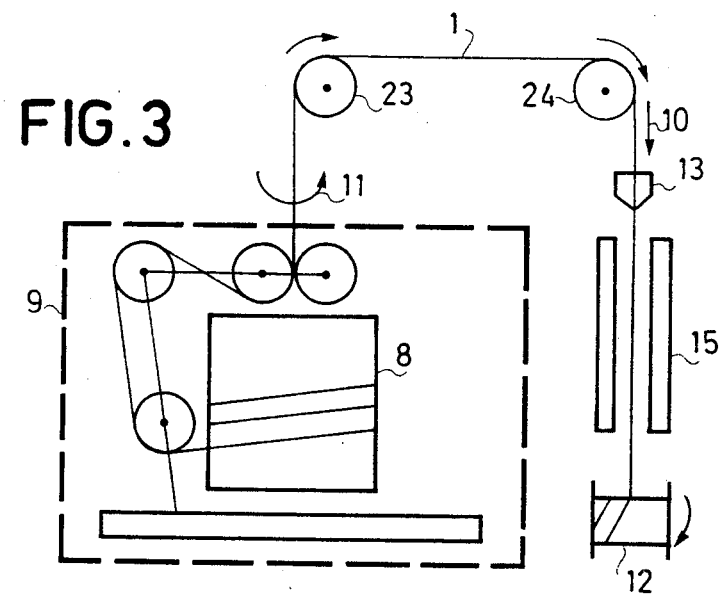

METHOD OF MANUFACTURING AN OPTICAL FIBER WITH CHIRALIC STRUCTURE AND A DEVICE FOR PUTTING THIS METHOD INTO PRACTICE

BACKGROUND OF THE INVENTION

1. Field of the Invention

The present invention relates to a method of manufacturing an optical fiber with chiralic structure and the device for putting such a method into practice.

The monomode fibers usually manufactured for telecommunications always have a small amount of linear birefringence and of circular birefringence. Consequently, these fibers keep neither linear polarization nor circular polarization.

It is possible to make the fiber very linear birefringent by breaking the circular symmetry to the benefit of a planar symmetry.

It is also possible to consider a reverse method, which consists in introducing a high circular birefringence so as to keep the circular polarization.

2. Description of the Prior Art

One solution for creating this circular polarization consists in subjecting the glass fiber to a static twisting force, for example applied externally by twisting between its two ends: one effect of twisting this fiber is to introduce therein a circular birefringence.

An optical fiber for maintaining circular polarization is obtained by subjecting the fiber to a static twisting force. One method for manufacturing such a fiber is described in an U.S. Pat. No. 4,427,717: the fiber, at the end of manufacture, is twisted between its two ends and the twisted state thus created is maintained by applying a coating which serves as binding sheath. The method described comprises two variants.

The first consists in twisting and coating the fiber during manufacture thereof and comprises the following steps:

drawing out the fiber;
twisting about the drawing axis;
coating with a rigid material (glass, vitroceramic, metal, plastic) which will freeze the fiber in the twisted state when it becomes solid;
possible coating with a protecting material if the product previously deposited is glass or a vitroceramic.

The second consists in twisting and coating a fiber after manufacture thereof and comprises the following steps:

drawing out the fiber,
twisting,
coating with a rigid material for maintaining the twisted state,
coating with a protecting material.

To apply this process, it is necessary to have a fiber drawing machine.

SUMMARY OF THE INVENTION

The method forming the subject of the present patent application allows a circular polarization to be induced and maintained in drawn monomode fibers coated with their protective sheath. It has the advantage of being able to be used for twisting fibers of any origin since it is not necessary to have means for manufacturing these fibers.

The invention provides then a process for manufacturing an optical fiber with chiralic structure which uses an optical fiber coated with a primary coating, comprising:

a step for twisting this fiber about its axis of symmetry at a temperature less than the vitreous transition temperature of this fiber;
a step for coating with a polymer in the viscous state so as to form an envelope for this fiber;
and a step for curing this polymer by increasing its YOUNG's modulus until a modulus is obtained situated in the range: 1 Giga Pascal, 100 Giga Pascal.

It further provides a device for putting such a method into practice.

BRIEF DESCRIPTION OF THE DRAWINGS

The invention will be better understood and other features will be clear from the following description with reference to the accompanying Figures in which:

FIG. 1 illustrates schematically a method of the prior art;

FIG. 2 illustrates an optical fiber such as used in the method of the invention;

FIG. 3 illustrates the method of the invention;

DESCRIPTION OF THE PREFERRED EMBODIMENTS

Figure 4:
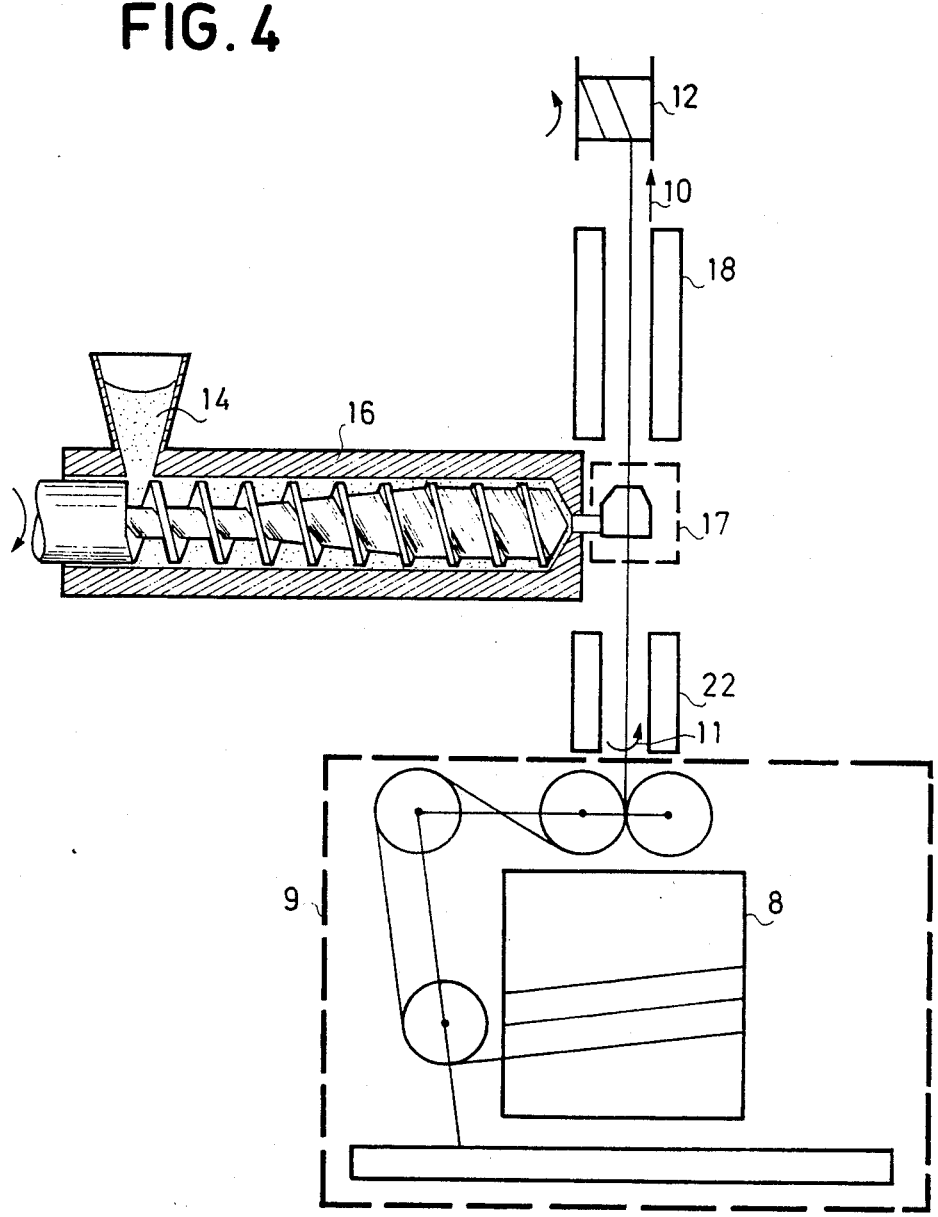
FIG. 4 illustrates a variant of the device for putting the method of the invention into practice.

In a prior art method shown schematically in FIG. 1, fiber 1, at the end of manufacture, that is to say after it has been drawn from a preform for example, is twisted with a great number of turns, then this twisted state is kept by holding this fiber at its two ends 2 and 3. A rigid binding sheath 4 is then applied for "immobilizing it" and so that it thus keeps its properties of conserving a circular polarization.

On the other hand, according to the method of the invention, the twisting and the maintenance of the twist do not take place at the time of manufacture of these fibers, on leaving the drawing machine.

The invention proposes using a monomode fiber, already manufactured, shown in FIG. 2 with its core and its optical sheath 6, already coated with a primary coating 7 (silicon or epoxy for example) so as to form circular polarization conservation fibers.

The present invention relates to the manufacture of optical fibers with conservation of circular polarization. This latter property is obtained by twisting the fiber in the elastic region of the glass, that is to say at a temperature less than the vitreous transition temperature of the fiber, so at a temperature less than 500° C. and by freezing this twisting by coating with a polymer material.

As shown in FIG. 3, a monomode fiber 1, coated with a primary coating and having suitable optogeometric parameters is wound on a feed drum 8. One end of fiber 1 is fixed to drum 8, the other is fixed to a take up drum 12 thus causing the fiber to advance 10 and for twisting it 11. The roles of drums 8 and 12 may be reversed, the take up drum thus becoming the drum which generates the twist 11 and the feed drum becoming the take up drum which causes the fiber to advance. This fiber is therefore twisted about its axis of symmetry which is its axis of advance, it is then coated by coating means 13 with a polymer 14 in the viscous state so as to form an envelope about this fiber. The envelope forming polymer is then cured by curing means 15 while increasing its YOUNG's modulus until a modulus is obtained between 1 Giga Pascal and a 100 Giga Pascal.

One of the two drums, here the feed drum 8, may form part of a prior art apparatus 9 which comprises different pulleys for causing, in this case, twist of the fiber. Pulleys 23 and 24 cause the fiber to advance.

Thus, in the method of the invention, the twist in the fiber is frozen between the feed drum and the twisting-take up device by means of a layer of a polymer having an elastic modulus greater than that of the primary coating.

Figure 5:
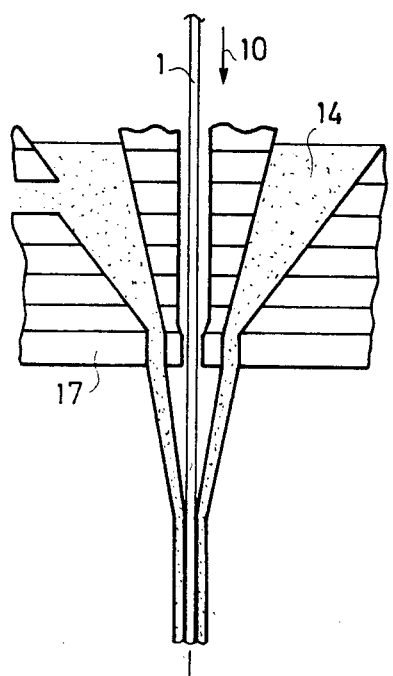
FIG. 5 illustrates a particular aspect of the device illustrated in FIG. 4.

Several devices may be envisaged for freezing the twist: the twisted fiber may be coated, as shown in FIG. 4, by extrusion of a thermoplastic material 14, charged or not, having a high module of elasticity. The twisted optical fiber 1 is sheathed by a technique similar to that used for sheathing cables. It passes through the right angled head 17 of an extruding machine 16 where it receives the extruded plastic material as shown in FIG. 5. The thermoplastic material used is rigid with a high modulus of elasticity at ambient temperature (greater than 1000 MPa) so as to freeze the twist induced in the fiber. For example polypropylene (1100–1600 MPa), high density polyethylene (1000–1200 MPa), the polyamides (1000–2500 MPa), polyvinylchloride (2400 MPa) and the polyesters (2000 MPa) may be used. The nature of the thermoplastic material depends on the nature of the protective coating of the fiber. In particular, the thermoplastic material should be able to be extruded at a temperature which the protective resin may withstand without suffering chemical damage.

The thermoplastic material may also be charged with glass fibers, which increases its rigidity.

Between the head 17 of the extruding machine 16 and the take up reel 12, the fiber is cooled 18 for example, by means of a cold gas flow by passing through a water tank, then drying.

For example, a fiber whose primary coating is an epoxy acrylate having a thickness of about 30 microns is sheathed by extruding a polyamide sheath 11 at a temperature of 250° having a thickness of at least 300 microns (modulus of elasticity equals 1000 MPa). The fiber may be preheated (22) before passing through the right angled head (17).

The fiber 1 wound on the feed drum 8 may, by way of non limitative example, be a monomode fiber The following numerical values may then be obtained:
outer diameter of the original fiber coated with a primary epoxyacrylate coating: 180 micrometers;
diameter of the optical sheath, for example: 30 micrometers;
core diameter: 6 micrometers;
thickness of the primary coating: 25 micrometers;
speed of travel through the extrusion head: a few meters/minute;
preheating of the original fiber before it passes through this extrusion head at about 250° C.
air cooling of the polymer coated fiber after passing through said extrusion head;
this polymer is a polyamide having a YOUNG's modulus of 1450 Mega Pascal;
the extrusion temperature is about 250° C.

Figure 6:
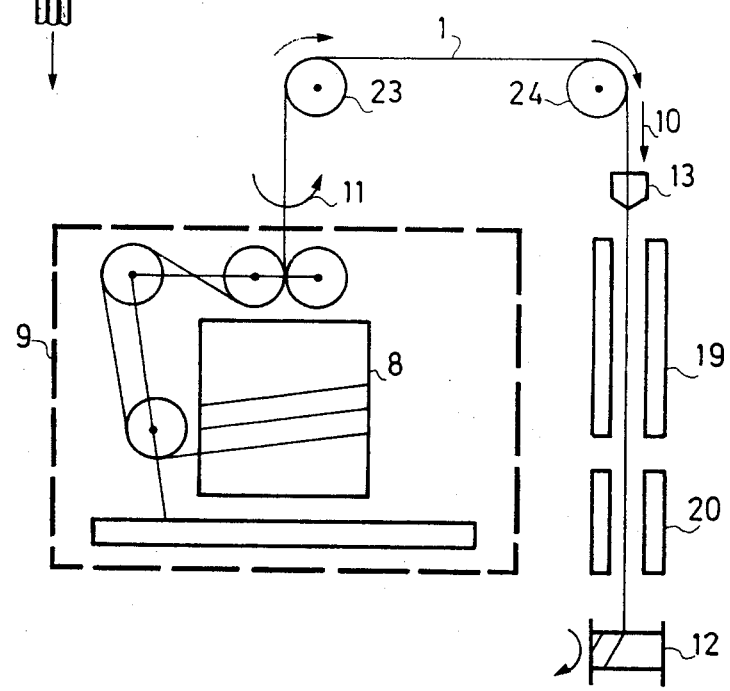
FIG. 6 illustrates a variant of the device for putting the method of the invention into practice.

The fiber 1 may be coated with a photoreticulable fluid material by passing through a coating tank as shown in FIG. 6.

The optical fiber 1 with its primary protective coating may also be twisted and coated with a photopolymerisable or photoreticulable resin by passing through an appropriate coating tank 13. This resin is then polymerized or reticulated at 19 by ultraviolet irradiation. Its nature has been chosen so that its modulus of elasticity, after irradiation, is higher than that of the primary coating and in any case greater than a 1000 MPa. Good adhesion to the primary coat will thus be obtained if the chemical structure of the resin is identical to that of the protective coating, for example, a fiber protected by an epoxy coating will be coated with an epoxy resin. The fiber wound on the feed drum may, by way of non limitative example, be a monomode fiber. Then the following numerical values may be obtained:
outer diameter of the original fiber with a primary coating: 160 micrometers;
core diameter: 7 micrometers;
coating with a polymer which is an epoxyacrylate prepolymer having a viscosity of a few poises over a thickness of about 200 micrometers.
curing by passing the coated fiber through an ultraviolet oven of a few kilowatts;
advancing speed: a few meters/minute.

The coating of the fiber deposited by the two variants of the method of the invention which has just been described may be reticulated (20) under the action of ionizing radiation.

In fact, should the mechanical characteristics of the polymer of the envelope with which the fibers has been coated not be sufficient, its modulus of elasticity may be increased by reticulating (20) the polymer forming the envelope by means of an ionizing irradiation (electrons, gamma rays). The chemical structure of the envelope is chosen so that the irradiation doses required for obtaining the desired effect are sufficiently small so as not to modify the optical properties of the fiber (less than 1 Mrad). An epoxyacrylate resin will for example be chosen having a high concentration of epoxy groups very sensitive to the ionizing radiation.

What is claimed is:

1. A method for manufacturing an optical fiber with a chiralic structure which uses an optical fiber coated with a primary coating, comprising:
twisting this fiber about its axis of symmetry at a temperature less than the vitreous transition temperature of this fiber;
coating with a polymer in the viscous state so as to form an envelope about this fiber;
and curing this polymer while increasing its YOUNG's modulus until a modulus is obtained in the range: 1 Giga Pascal, 100 Giga Pascal.

2. The method as claimed in claim 1, wherein said primary coating is made from silicon.

3. The method as claimed in claim 1, wherein said primary coating is made from epoxy.

4. The method of claim 1, wherein said polymer is chosen from the following materials: polypropylene, high density polyethylene, polyamides, polyvinylchloride, or polyester.

5. The method of claim 1, wherein said polymer is a resin which is photoreticulable under ultraviolet radiation.

6. The method as claimed in claim 5, wherein said photoreticulable resin is an epoxyacrylic resin.

7. A device for manufacturing an optical fiber with a chiralic structure, comprising a feed drum on which is wound an optical fiber coated with a primary coating and means for winding this fiber on a take up drum while causing it to advance and twisting it about its axis of symmetry, means for coating this fiber once twisted with a polymer so as to form an envelope about this fiber and means for curing said envelope being disposed between said feed drum and said take up drum.

8. The device as claimed in claim 7, wherein said coating means comprise a right angled extruder head through which passes the optical fiber coated with its primary coating.

9. The device as claimed in claim 8, comprising means for heating the fiber situated between the feed drum and said extruder head.

10. The device as claimed in claim 8, wherein said curing means comprise cooling means.

11. The device as claimed in claim 10, wherein said cooling means are cooling means using a cold gas flow.

12. The device as claimed in claim 10, wherein said cooling means comprise a water tank through which the fiber passes followed by drying means.

13. The device as claimed in claim 7, wherein said coating means comprise a coating tank.

14. The device as claimed in claim 13, wherein said curing means comprise means for reticulating said envelope using ultraviolet radiation.

15. The device as claimed in claim 7, wherein said curing means comprise means for reticulating said envelope by ionizing radiation.

16. The device as claimed in claim 15, wherein said ionizing radiation is an electron beam.

17. The device as claimed in claim 15, wherein said ionizing radiation is gamma radiation.

* * * * *